United States Patent
Salgado et al.

(10) Patent No.: US 7,054,024 B2
(45) Date of Patent: May 30, 2006

(54) SYSTEM FOR SEGMENTING LARGE FILES IN AN SMTP NETWORK INCLUDING A DIGITAL INPUT SCANNER

(75) Inventors: David L. Salgado, Victor, NY (US); Michael W. Barrett, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 848 days.

(21) Appl. No.: 10/179,661

(22) Filed: Jun. 24, 2002

(65) Prior Publication Data
US 2003/0234956 A1    Dec. 25, 2003

(51) Int. Cl.
*G06F 3/12* (2006.01)
(52) U.S. Cl. ............... 358/1.15; 358/402; 709/228; 370/390
(58) Field of Classification Search ............... None
See application file for complete search history.

(56) References Cited

U.S. PATENT DOCUMENTS

| 5,767,978 A * | 6/1998 | Revankar et al. ........... 358/296 |
| 6,574,670 B1 * | 6/2003 | Eguchi ....................... 709/245 |
| 2002/0075803 A1 * | 6/2002 | Zaharychuk et al. ........ 370/231 |

* cited by examiner

*Primary Examiner*—Mark Zimmerman
*Assistant Examiner*—Mario Ayele
(74) *Attorney, Agent, or Firm*—R. Hutter

(57) ABSTRACT

In a digital scanner or other source for sending documents by electronic mail to a client, the size of the document is determined and a calculation is made of how many segments the document must be divided into. If the required number of segments is so large as to present a risk of flooding a network, a warning is displayed to a user. The system is particularly useful in the context of scanning to e-mail full-color images.

16 Claims, 2 Drawing Sheets

SYSTEM FOR SEGMENTING LARGE FILES IN AN SMTP NETWORK INCLUDING A DIGITAL INPUT SCANNER

TECHNICAL FIELD

The present invention relates to electronic mail (e-mail) systems, such as using the familiar SMTP protocol. In particular, the present invention is useful in the context of "scan to e-mail," wherein a hardcopy document is scanned into a digital scanner and the resulting digital data is sent through an e-mail server.

BACKGROUND

FIG. 1 is a diagram showing the elements of an e-mail system, especially for sending e-mail including images from a hard-copy scanner to the Inbox of a recipient or "client." Such "scan-to-e-mail" functions are common in the context of digital copiers. Here, a "sender" 10, which may be in the form of any source of data to be sent, such as personal computer, but which is here shown as a digital copier with a hard-copy scanner, sends a set of data to a first server 12, which is typically an SMTP or internet fax server familiar in the art. The data is then relayed from first server 12 to a chain of subsequent servers, here indicated as 14a, 14b, etc. As is familiar in e-mail systems, an e-mail message will pass through any number of servers 14a, 14b, etc., until a desired destination is reached. At the message's destination, a server 16, such as a POP3 or IMAP server as generally known in the art, retains the data for access by a client associated therewith, such as a personal computer having an e-mail account.

The first SMTP server 12 in a chain represents a barrier for documents of a size larger than some maximum. Many SMTP servers have a set maximum size of any data file that can be admitted thereto for further relaying: such a maximum size is typically 10 MB, but in practical situations can be as low as 2 MB. It is known, however, that a large document can be broken up or, as will be called here, "segmented" into smaller files, which are sent separate through a network and reassembled at the client, in a manner which is largely invisible to a casual user. A vendor of software for performing this segmentation and reassembly is Allegro® RomMailer™, which will perform the segmentation if the job is greater than a preset maximum; however, as far as is known, this software merely sends off segments of the job as it is processed, and at no time calculates a total size of the job or cares how many segments are being created.

Given presently-supported standards for SMTP servers, the SMTP server such as 12 simply returns to the sender 10 a document that it has deemed to be too large: there is generally no means by which a sender of a document to a server can know in advance what the maximum size of a document or file can be submitted to any SMTP server. If a message known to be large is arbitrarily divided into segments with each segment sent as a separate e-mail message, a practical problem can occur in a network with too many such messages flooding a network, and interfering with the relaying of other, unrelated e-mail messages. However, because of the essentially passive nature of e-mail servers as currently supported (i.e., too-large segments are simply sent back, and/or a flooded server simply accepts no more segments), it is difficult to prevent such flooding of a network by the sending of a large message. This problem of very large e-mail messages becomes particularly acute when full-color images such as photographs are attempted to be sent from a computer or a hard-copy scanner, as a small number of such images can approach a maximum segment size for a server.

The present invention relates to a system which can help control the traffic of segments of a large e-mail message.

SUMMARY OF THE INVENTION

According to one embodiment of the present invention, there is provided a method of conveying a document to an electronic mail server. A data size of a document desired to be sent is determined. If the data size is not more than a predetermined maximum size, the document is sent to the electronic mail server.

According to another embodiment of the present invention, there is provided digital hard-copy scanning apparatus, comprising a scanner for scanning a hard-copy image and obtaining a document at least in part therefrom. Means are provided for sending the document to an electronic mail server if the data size of the document is not more than a predetermined maximum size.

As used herein, the term "document" shall be construed broadly to include any amount of data, of one or more types, which is to be considered a single entity. As such, a document can be, for instance, an e-mail or internet fax message with any number of attachments, the attachments being in any format such as pdf, JPEG, MPEG, or TIFF, or in an application such as a word-processing program; also, a document can be, in whole or in part, the result of a scanning operation, such as from a digital scanner or copier.

DETAILED DESCRIPTION

Figure 1:
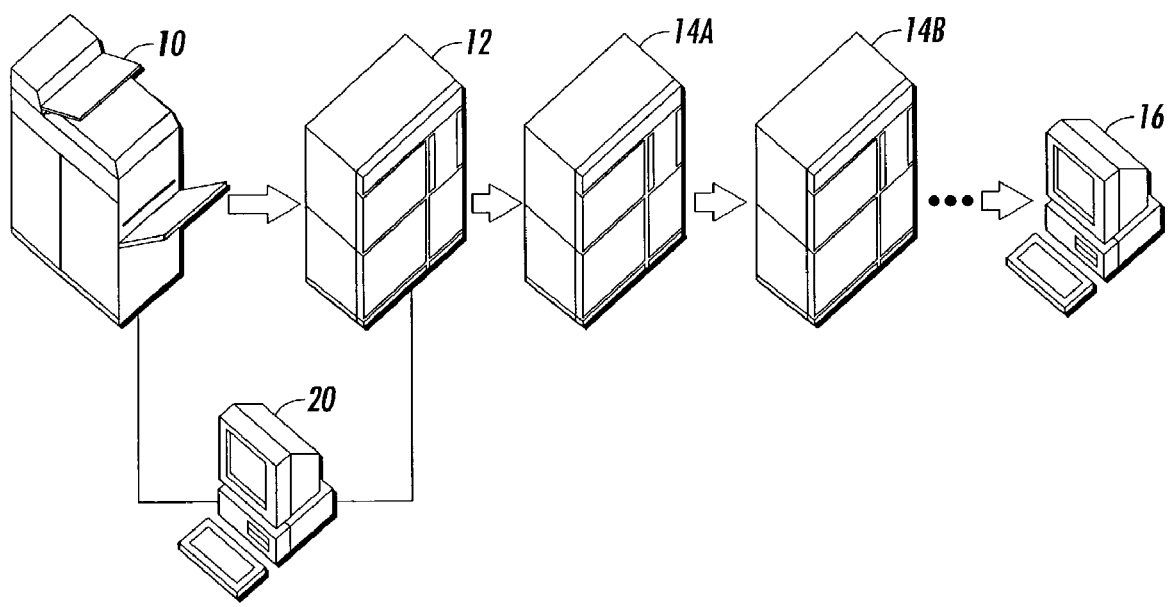
FIG. 1 is a diagram showing the elements of an e-mail system.
Figure 2:
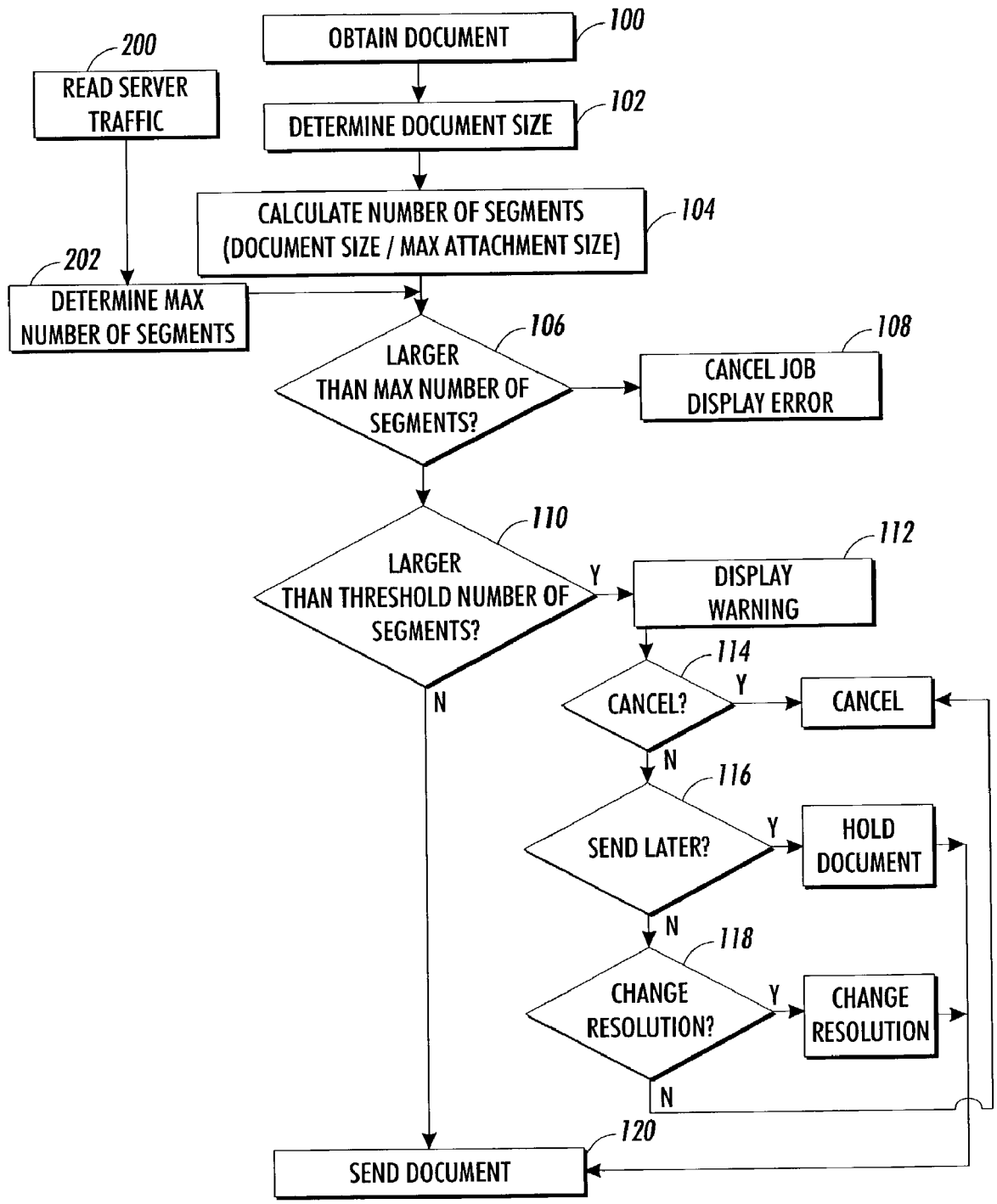
FIG. 2 is a flowchart showing a method according to one embodiment of the present invention.

FIG. 2 is a flowchart showing a method according to one embodiment of the present invention. The method shown in the flowchart is manifest in software that runs on, or is otherwise associated with, a "source" such as the digital copier shown in FIG. 1. The first step 100 can be called "obtaining" the document, by which is meant, in a scan-to-e-mail context, scanning the hard-copy images and retaining the resulting image data in a known format such as TIFF.

The next step, shown at 102, is to determine the document size. The size of a document, can be determined by direct measurement, by checking how much memory is consumed by the document, or by estimating the size from one or more easily-obtained attributes of the document, by for instance counting how many pages have been scanned in a scanning step and noting whether the document is intended to be color or monochrome. If the document is originating as purely computer-generated data, such as a simple e-mail message with attachment, the size of the document can be measured by readily-accessible means, such as by looking at the document size on a word-processing document, or by querying a disk at the source computer. Even in cases of direct measurement of document size, it can be useful for subsequent calculation to factor an "overhead" value to take into account headers, recipient information, information about the sending device, MIME encoding information, and other information which would accompany an e-mail or internet fax message. In one embodiment, the overhead factor requires that the measured size of a document be augmented by 38% for purposes of determining the size of the document for subsequent algorithms.

Once the size of the document is determined, the number of necessary segments for sending the document can be calculated. A predetermined maximum attachment size that is likely to be accepted by a typical server, such as 2 MB, is used a divisor in the calculation, as shown at step 104. Once again, in a current practical embodiment, a typical SMTP server does not have provision for informing a source of its maximum attachment size, so the "worst-case scenario," i.e., the smallest practical attachment size, has to be used.

When the number of necessary segments is thus calculated, it must be determined whether the number of segments is so large as to present a danger of flooding a network. The number of segments which are deemed to be too many is determined by a local system administrator who is familiar with the capabilities and usage patterns of the network between the source 10 and the first server 12. If, for a particular document, the necessary number of segments is determined to be higher than the maximum, such as at step 106, the sending job is cancelled and an error message is displayed to the human sender (step 108), either at the user's computer or at a user interface associated with the scanner or digital copier.

Even if the number of necessary segments is allowable but still very large, that is, over a threshold such as determined at step 110, it may still be advisable to display to the human user that sending of the document may be problematic, such as at step 112. (The display can be made at any source computer, or at a user interface of a scanning device or digital copier such as 10.) The user may be given the option to not send the document (step 114), such as by canceling the scanning or sending, or can be given another option such as to hold the documents at the user's computer or the scanner for sending at some other time when the job is less likely to flood the network, such as, in some cases, at midnight (step 116). If the source is a scanning device, another option for the user is to adjust the scanning parameters to decrease the scanning resolution, thereby making the document smaller (step 118).

Finally, once it is determined that the document is ready to be sent to a client, it is sent through known e-mail of internet fax means (step 120).

One useful practical option is to allow the system administrator (SA), via a control computer such as 20 in FIG. 1, to be able to set both the maximum allowable and threshold number of segments (or, more generally, document size) differently for different computers or scanners on a network, in order to balance the needs of individual users against the total capabilities of a network. For instance, an individual graphic-arts user on a network may be given a larger "allotment" of segments per document versus other users, or a high-ranking employee may be permitted to override his allotment, at his own computer, for certain jobs. It is also possible to a have a system where an SA can generally find out how much traffic has gone through the first server in, for instance, the last hour (such as at step 200), and then change allotments to each source in response thereto (step 202). For example, if the SA at computer 20 sees traffic (e.g. segments in the last hour) below a certain threshold, the SA may allow sources under SA control to send documents of up to 100 segments to the first server 12; if more than the threshold traffic has been detected, the SA through computer 20 can allot some or all computers under SA control only 50 segments per document.

The overall effect of the present invention is to facilitate the sending of large documents, especially those involving complex full-color images and especially such images originating from hard-copy scanners, through existing and legacy e-mail servers and networks, without causing flooding of such networks. Because the method can be manifest entirely within a scanner or digital copier, the embodiment can be used immediately with currently common types of e-mail servers and does not require any alteration or modification of any servers.

The invention claimed is:

1. A method of conveying a document to an electronic mail server, comprising:
   determining a document size of a document desired to be sent;
   calculating a number of segments into which the document is to be divided;
   comparing the calculated number of segments to a maximum number of segments, thereby comparing the document size to a maximum document size; and
   if the document size is not more than the maximum document size, sending the document to the electronic mail server.

2. The method of claim 1, the calculating step including taking into account a maximum segment size.

3. The method of claim 2, the maximum segment size being related to a maximum attachment size known to be allowed by the electronic mail server.

4. The method of claim 1, further comprising
   reading an amount of traffic associated with the electronic mail server; and
   determining the maximum number of segments based on the amount of traffic.

5. The method of claim 1, further comprising
   holding the document for sending to the electronic mail server until a predetermined time if the document is larger than a threshold document size.

6. The method of claim 1, further comprising
   scanning a hard-copy image; and
   obtaining the document at least in part from the scanning step.

7. The method of claim 6, further comprising
   estimating the data size of the document as a result of an attribute of the scanning step.

8. The method of claim 6, further comprising
   changing a resolution of the document, thereby decreasing the document size.

9. The method of claim 8, wherein the changing step occurs if the document is larger than a threshold document size.

10. The method of claim 1, further comprising
    communicating to a user in response to determining that the document size is greater than predetermined threshold size.

11. A digital hard-copy scanning apparatus, comprising:
    a scanner for scanning a hard-copy image and obtaining a document at least in part therefrom;
    means for determining a size of the document, and said means including means for calculating a number of segments into which the document is to be divided and comparing the calculated number of segments to a maximum number of segments; and
    means for sending the document to an electronic mail server if the size of the document is not more than a maximum size.

12. The apparatus of claim 11, further comprising means for holding the document for sending to the electronic mail server until a predetermined time if the document is larger than a threshold document size.

13. The apparatus of claim 11, further comprising means for estimating the data size of the document as a result of an attribute of a scanning operation.

14. The apparatus of claim 11, further comprising means for changing a resolution of the document, thereby decreasing the document size.

15. The apparatus of claim 14, wherein a resolution-changing operation occurs if the document is larger than a threshold document size.

16. The apparatus of claim 11, further comprising means for communicating to a user in response to determining that the document size is greater than predetermined threshold size.

* * * * *